United States Patent [19]

Okazaki et al.

[11] Patent Number: 4,943,515
[45] Date of Patent: Jul. 24, 1990

[54] INFORMATION RECORDING MEDIUM

[75] Inventors: Masaki Okazaki, Minami-ashigara; Masao Yabe, Fujinomiya; Ken Kawatta, Minami-ashigara, all of Japan

[73] Assignee: Fuji Photo Film Co., Ltd., Minami-ashigara, Japan

[21] Appl. No.: 310,023

[22] Filed: Feb. 10, 1989

Related U.S. Application Data

[63] Continuation of Ser. No. 134,058, Dec. 17, 1987, abandoned.

[30] Foreign Application Priority Data

Dec. 17, 1986 [JP] Japan ................................ 61-302100

[51] Int. Cl.$^5$ .......................... G11B 7/24; G03C 1/72; G03C 5/16; B41M 5/26
[52] U.S. Cl. .................................. 430/270; 430/495; 430/6218; 430/945
[58] Field of Search ............... 430/270, 495, 945, 618, 430/570, 581, 592

[56] References Cited

U.S. PATENT DOCUMENTS

| 4,259,424 | 3/1981 | Endo et al. | 430/49 |
| 4,359,524 | 11/1982 | Masuda et al. | 430/618 |
| 4,465,767 | 8/1984 | Oba et al. | 430/945 |
| 4,603,103 | 7/1986 | Hirai et al. | 430/618 |
| 4,617,257 | 10/1986 | Sawada et al. | 430/592 |
| 4,656,121 | 4/1987 | Sato et al. | 430/495 |
| 4,673,626 | 6/1987 | Takeda et al. | 430/14 |

Primary Examiner—Paul R. Michl
Assistant Examiner—Mark R. Buscher
Attorney, Agent, or Firm—Sixbey, Friedman, Leedom & Ferguson

[57] ABSTRACT

A novel information recording medium comprising a substrate and a recording layer for writing and/or reading information by means of a laser beam which is provided on the substrate is disclosed. The recording layer contains a dye having at least one chromophore selected from the group consisting of an amidinium ion chromophore, a carboxyl ion chromophore and a dipolar amide chromophore, and an organic solvent-soluble silver salt. Alternatively, the recording layer contains said chromophore and this recording layer is arranged in contact with a layer of an organic solvent-soluble silver salt.

12 Claims, 1 Drawing Sheet

INFORMATION RECORDING MEDIUM

This application is a continuation of Ser. No. 07/134,058, file Dec. 17, 1987, now abandoned.

BACKGROUND OF THE INVENTION

1. Field of the Invention

The present invention relates to an information recording medium for writing (i.e., recording) and/or reading out (i.e., reproducing) information by means of a laser beam having high energy density.

2. Description of Prior Art

Information recording media for recording and/or reproducing information by the use of a laser beam have been developed in recent years and are put to practical use. Such recording media have been widely utilized in various fields, for example, as an optical disc such as a video disc and an audio disc as well as a disc memory for a large-capacity computer and a large-capacity static image file, a micro-image recording medium, a ultra-micro-image recording medium, a micro-facsimile, and an optical card.

The conventional optical information recording medium basically comprises a transparent substrate of a plastic or glass material and a recording layer provided on the substrate. As materials of the recording layer, metals such as Bi, Sn, In and Te or semimetals, and dyes such as a cyanine dye, a metal complex compound and a quinone dye are generally known.

Writing (i.e., recording) of information on the recording medium can be conducted, for example, by irradiating the medium with a laser beam. Under irradiation with the laser beam, the irradiated area of the recording layer of the recording medium absorbs energy of the beam and rise of temperature locally occurs and, as a result, a chemical or physical change is caused to alter (or change) optical characteristics of the recording layer in the irradiated area, whereby the recording of information can be made. Reading of the information from the recording medium is also conducted by irradiating the medium with a laser beam. The information can be reproduced by detecting reflected light or transmitted light corresponding to the change in the optical characteristics of the recording layer.

Recently, an optical disc having an air-sandwich structure for protecting the recording layer has been proposed. The optical disc of air-sandwich structure comprises two disc-shaped substrates, a recording layer provided on at least one of the substrates and two ring-shaped spacers (inner spacer and outer spacer), said two substrates interposing the recording layer being combined with each other in such a manner that a closed space is formed by the two substrates and the two spacers. In such recording medium, the recording layer is kept from direct exposure to an outer air, and recording or reproduction of information is carried out by applying light of the laser beam to the recording layer through the substrate, whereby the recording layer is generally kept from physical or chemical damage. Further, the surface of the recording layer can be kept from deposition of dust which likely causes troubles in the recording and reproducing procedures.

As mentioned above, inorganic materials such as metals and semimetals or dyes have been conventionally used for forming the recording layer. For example, Japanese Patent Provisional Publication No. 58(1983)-112790 discloses that a cyanine dye or a merocyanine dye is used alone as a recording material of the recording medium. However, most of those dyes generally have a peak ($\lambda$ max) of the reflection spectrum at approx. 600 mn, and this peak is on the shorter wavelength side than the wavelength of a semiconductor laser (generally at approx. 800 nm) which is generally used in the recording or reproduction of information for the recording medium, so that the reflectance of the resulting recording layer is low and a S/N ratio thereof is in the recording procedure is not high. For shifting the peak wavelength ($\lambda$ max) of the reflection spectrum to a longer wavelength side, it is thought that the ethylene chain of the dye compound is prolonged, that is, n in $(CH=CH)_n$ is made larger. In this case, however, the resulting recording layer comprising the dye compound deteriorates in durability (endurance), especially in the durability in the reading procedure (i.e., resistance to light).

SUMMARY OF THE INVENTION

It is an object of the present invention to provide an information recording medium using a dye as a recording material which has a high S/N ratio in the reproduction procedure and is improved in the endurance.

It is another object of the invention to provide an information recording medium which can be prepared at a low manufacturing cost.

There is provided by the invention an information recording medium comprising a substrate and a recording layer for writing and/or reading information by means of a laser beam which is provided on the substrate, wherein said recording layer contains a dye having at least one chromophore selected from the group consisting of an amidinium ion chromophore, a carboxyl ion chromophore and a dipolar amide chromophore, and an organic solvent-soluble silver salt.

There is further provided by the present invention an information recording medium comprising a substrate and a recording layer for writing and/or reading information by means of a laser beam which is provided on the substrate, wherein said recording layer contains a dye having at least one chromophore selected from the group consisting of an amidinium ion chromophore, a carboxyl ion chromophore and a dipolar amide chromophore, and a layer of an organic solvent-soluble silver salt is provided in contact with the recording layer.

According to the present invention, a combination of a specific dye such as a merocyanine dye and an organic solvent-soluble silver salt is employed as a recording material, whereby the resulting information recording medium is remarkably enhanced in the reflectance and improved in the endurance.

In more detail, the silver salt is contained in the recording layer in addition to the dye or contained in an adjoining layer to the recording layer in such manner that the silver salt is arranged into contact with the dye, whereby a silver ion of the silver salt is bonded to the dye in the recording layer or on the interface between the recording layer and the adjoining layer. As a result, the reflection peak wavelength ($\lambda$ max) of the dye shifts toward a longer wavelength side to become approx. 800 nm that overlaps the wavelength as of a semiconductor laser. Hence, the reflectance of the recording layer is increased and the recorded information is read out from the medium at an enhanced S/N ratio in the reproduction procedure.

Further, the recording medium containing the specific dye and silver salt according to the invention is excellent in the endurance, particularly in the reading endurance, so that the medium hardly suffers from troubles accompanying the employment of a cyanine dye or a merocyanine dye having a long ethylene chain, which are liable to take place in the conventional medium.

Moreover, the recording layer according to the invention can be easily formed on the substrate by a conventional coating method, because both of the dye and the silver salt used in the invention are soluble in an organic solvent. Accordingly, the manufacturing cost can be reduced, and the manufacturing operation can be simplified.

In the case that the organic solvent-soluble silver salt is contained in the layer adjoining to the recording layer in the recording medium of the invention, there is no specific limitation on the order of lamination of the recording layer and the layer of the silver salt, provided that those layers are arranged in contact with each other. In other words, any layer of the recording layer and the layer of the silver salt can be arranged on the substrate side of the medium.

DETAILED DESCRIPTION OF THE INVENTION

The information recording medium of the present invention is now described in detail referring to the attached drawings.

Figure 1:
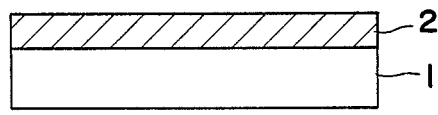
FIGS. 1, 2 and 3 are sectional views showing various embodiments of the constitution of an information recording medium according to the present invention.
Figure 2:
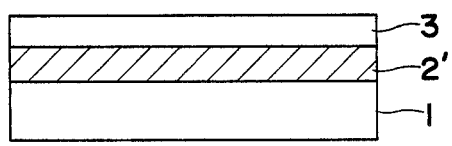
Figure 3:
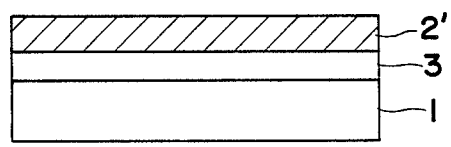

Each of FIGS. 1, 2 and 3 is a sectional view showing an embodiment of the constitution of the information recording medium according the invention.

In FIG. 1, the recording medium comprises a substrate 1 and a recording layer 2 provided on one surface of the substrate. The recording layer 2 comprises a dye and a silver salt.

In FIG. 2, the recording medium comprises a substrate 1, a recording layer 2' and a silver salt layer 3, superposed in order. The recording layer 2' comprises a dye.

In FIG. 3, the recording medium comprises a substrate 1, a silver salt 3 and a recording layer 2', superposed in order.

The above-mentioned embodiments are given by no means to restrict the recording medium of the present invention, and other embodiment can be also included in the invention. For example, a variety of intermediate layers such as an undercoating layer or a pregroove layer can be provided between the substrate and the recording layer. Further, the recording medium of the invention may be in the form of combined structure or in the form of air-sandwich structure.

The information recording medium of the invention can be prepared, for example, in the following manner.

A material of the substrate employable in the invention can be selected from any materials which have been employed as the substrates of the conventional recording media. From the viewpoint of optical characteristics, smoothness, workability, handling properties, long-term stability and manufacturing cost, preferred examples of the substrate material include glass such as tempered glass (e.g., soda-lime glass), acrylic resins such as cell-cast polymethyl methacrylate and injection-molded polymethyl methacrylate; vinyl chloride resins such as polyvinyl chloride and vinyl chloride copolymer; epoxy resins; polycarbonate resins; amorphous polyolefins; and polyesters. Among those materials, most preferred are polymethyl methacrylate, polycarbonate resins, epoxy resins amorphous polyolefins, polyesters and glass. These materials can be employed as substrates in the form of a flexible film or in the form of a rigid plate.

The surface of the substrate on which a recording layer is to be coated may be provided with an undercoating layer for the purpose of improving smoothness and adhesion to the recording layer and preventing the recording layer from being denatured. Examples of materials for the undercoating layer include polymer materials such as polymethyl methacrylate, acrylic acid/methacrylic acid copolymer, styrene/maleic anhydride copolymer, polyvinyl alcohol, N-methylol acrylamide, styrene/sulfonic acid copolymer, styrene/vinyl toluene copolymer, chlorosulfonated polyethylene, nitrocellulose, polyvinyl chloride, chlorinated polyolefin, polyester, polyimide, vinyl acetate/vinyl chloride copolymer, polyethylene, polypropylene and polycarbonate; organic materials such as silane-coupling agents; and inorganic materials such as inorganic oxides (e.g., $SiO_2$, $Al_2O_3$), and inorganic fluorides (e.g., $MgF_2$).

In the case of a glass substrate, an undercoating layer made of a polymer having a hydrophilic group and/or a maleic anhydride group such as a styrene/maleic anhydride copolymer is preferably provided thereon for the purpose of preventing the recording layer from adverse effects caused by an alkali metal ion and an alkaline earth metal ion liberating from the substrate.

The undercoating layer can be formed, for example, by dissolving or dispersing the above-mentioned material in an appropriate solvent and coating the solution or dispersion on a substrate through a known coating method such as spin coating, dip coating, or extrusion coating. The thickness of the undercoating layer is generally in the range of 0.005 to 20 μm, preferably in the range of 0.01 to 10 μm.

On the substrate (or the undercoating layer) may be provided a pregroove layer for the purpose of forming a tracking groove or protruded and depressed portions which indicate information such as address signals. As a material for the pregroove layer, there can be employed a mixture of at least one monomer (or oligomer) selected from the group consisting of monoester, diester triester and tetraester of an acrylic acid and a photopolymerization initiator.

The pregroove layer can be formed on the substrate (or the undercoating layer) by the process described below. In the first place, a mixture solution of the acrylic acid ester and the photopolymerization initiator is coated on a precisely prepared stamper, and on the coated layer of the solution is placed a substrate. Then the coated layer is cured under irradiation with ultraviolet rays via the stamper or the substrate so as to fix the substrate to the liquid phase of the coated layer. Subsequently, the substrate is separated from the stamper. Thus, a substrate provided with a pregroove layer can be prepared. The thickness of the pregroove layer is generally in the range of 0.05 to 100 μm, preferably in the range of 0.1 to 50 μm. In the case of a plastic substrate, the pregroove layer may be formed directly on the substrate by means of injection molding or extrusion molding.

On the substrate (or the undercoating layer, etc.) is provided a recording layer.

The recording layer is a layer which comprises a dye having at least one chromophore selected from the group consisting of an amidinium ion chromophore, a carboxyl ion chromophore and a dipolar amide chromophore, and an organic solvent-soluble silver salt. However, the dye and the silver salt are not necessarily contained in the same layer, and each of them can be contained in an individual layer. That is, only the dye can be contained in the recording layer, and in this case, the silver salt is contained in the adjacent layer to the recording layer.

The dye employable in the invention has at least one chromophore (i.e., chromophoric group) selected from the group consisting of an amidinium ion chromophore, a carboxyl ion chromophore and a dipolar amide chromophore.

The amidinium ion chromophore has the following formula:

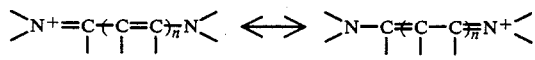

Examples of the dyes having the amidinium ion chromophore are as follows.

Cyanine dye:

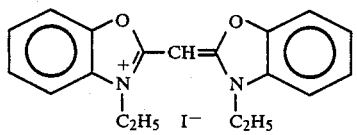
(i)

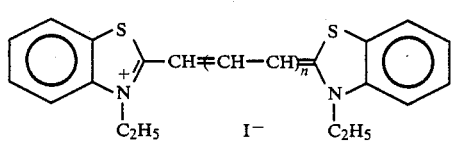
(ii)

Styryl dye:

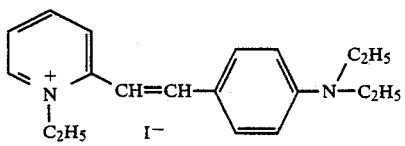
(iii)

Hemicyanine dye:

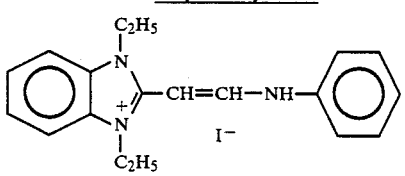
(iv)

Xanthene dye:

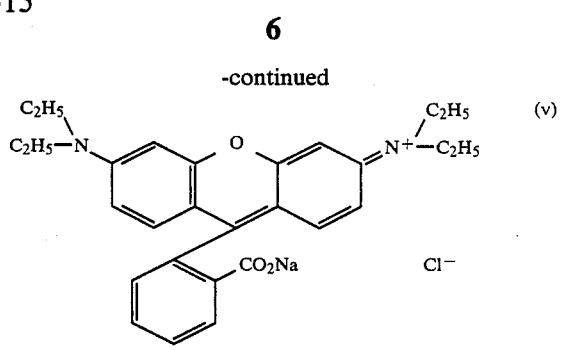
(v)

The carboxyl ion chromophore has the following formula:

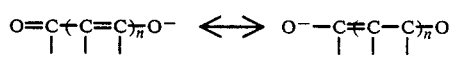

Examples of the dyes having the carboxyl ion chromophore are as follows.

Xanthene dye:

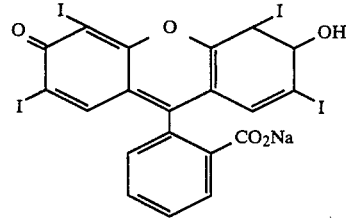
(vi)

Oxonole dye:

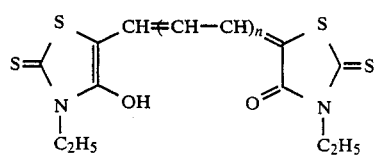
(vii)

The dipolar amide chromophore has the following formula:

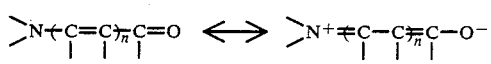

Examples of the dyes having the dipolar amide chromophore are as follows.

Merocyanine dye:

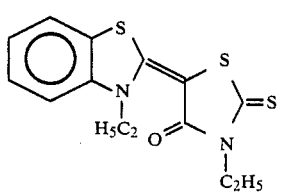
(viii)

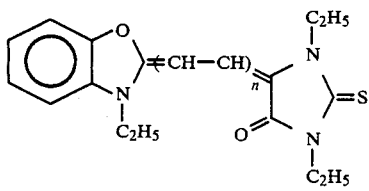

Azamethine dye wherein a carbon atom of a methine chain is substituted by a nitrogen atom:

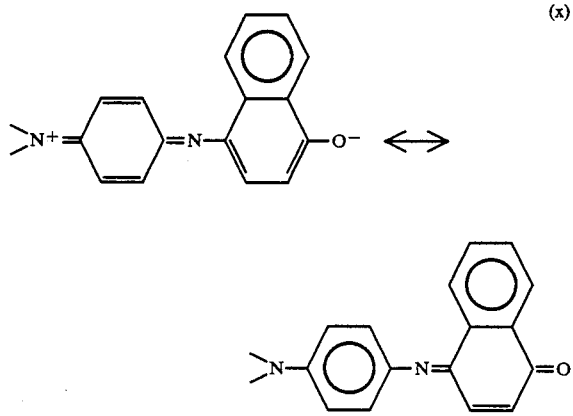

In addition to the above-mentioned dyes, there can be mentioned complex dyes of those dyes, namely, a rhodacyanine dye.

Examples of the rhodacyanine dyes are as follows:

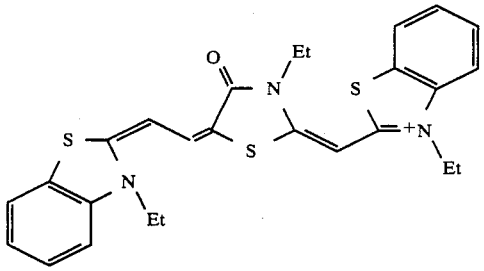

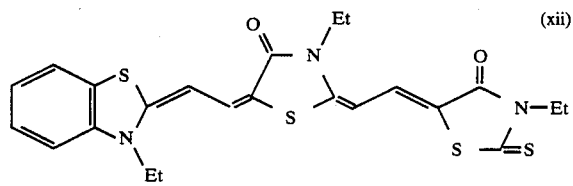

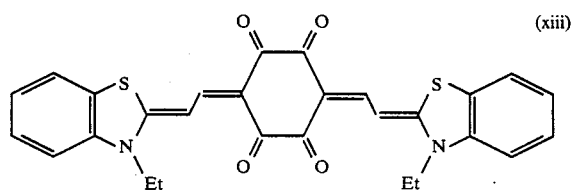

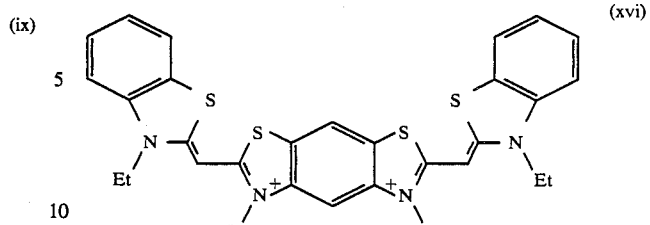

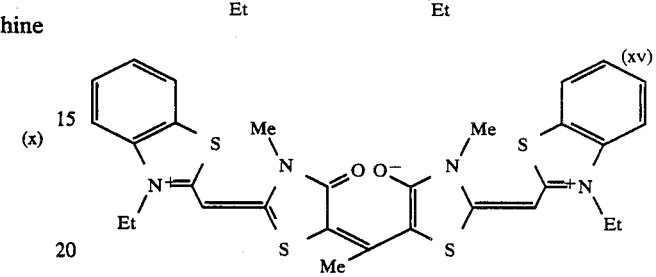

When the dye compounds described above are brought into contact with a silver salt (described hereinafter), a silver ion in the silver salt is coordinated by the electron donative atom of said compound such as nitrogen or sulfur atom, and the reflection spectrum of the compound shifts to the longer wavelength side and becomes to overlap the wavelength of a laser beam given by a semiconductor laser. As a result, the reflectance of the recording layer for the laser beam can be increased.

Among the above-mentioned dyes, most preferred are merocyanine dyes from the viewpoint of solubility, etc. For example, preferably employed is a merocyanine dye having the formula (I):

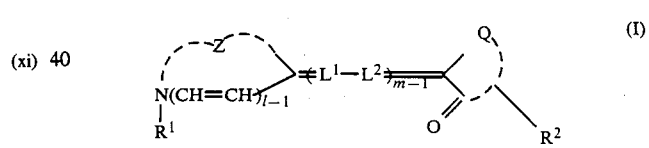

in which Z is a nonmetal atom group required for forming a 5–6 membered heterocyclic ring; Q is a nonmetal atom group required for forming a heterocyclic ring of 5–6 members containing a nitrogen atom; each of $L^1$ and $L^2$ is a methine group or a substituted methine group; $l$ is 1 or 2, m is 3 or 4, and l and m is integers satisfying the condition of $l+m=5$; $R^1$ is an alkyl group having 1–18 carbon atoms, a substituted alkyl group (alkyl group has 1–18 carbon atoms), an allyl group or a compound having the following formula:

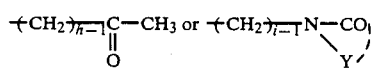

in which Y is a cyclic imide group, and each of h and i is an integer of 2 to 5; and $R^2$ is bonded to the nitrogen atom of said heterocyclic group and is an alkyl group having 1–18 carbon atoms, a substituted alkyl group (alkyl group has 1–18 carbon atoms), an allyl group, an aryl group having 1–18 carbon atoms, a substituted aryl group, a heterocyclic group or a compound having the following formula:

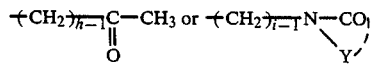

in which Y, h and i have the same meanings as defined above.

Examples of the heterocyclic group having Z in the above formula (I) are as follows:

thiazole nucleus: thiazole, 4-methylthiazole, 4-phenylthiazole, 4,5-dimethylthiazole and 4,5-diphenylthiazole;

benzothiazole nucleus: benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenetylbenzothiazole, 5-fluorobenzothiazole, 5-chloro-6-methylbenzothiazole, 5,6-dimethylbenzothiazole, 5-hydroxy-6-methylbenzothiazole, tetrahydrobenzothiazole and 4-phenylbenzothiazole;

naphthothiazole nucleus: naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole and 5-methoxynaphtho[2,3-d]thiazole;

thiazoline nucleus: thiazoline, 4-methylthiazoline and 4-nitrosothiazoline;

oxazole nucleus: oxazole, 4-methyloxazole, 4-nitroxazole, 5-methyloxazole, 4-phenyloxazole, 4,5-diphenyloxazole and 4-ethyloxazole;

benzoxazole nucleus: benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole and 5-ethoxybenzoxazole;

naphthoxazole nucleus: naphtho[2,1-d]oxazole, naphto[1,2-d]oxazole, naphtho[2,3-d]oxazole and 5-nitronaphtho[2,1-d]oxazole;

oxazoline nucleus: 4,4-dimethyloxazoline;

selenazole nucleus: 4-methylselenazole, 4-nitroselenazole and 4-phenylselenazole;

benzoselenazole nucleus: benzoselenazole, 5-chlorobenzoselenazole, 5-nitrobenzoselenazole, 5-methoxybenzoselenazole, 5-hydroxybenzoselenazole, 6-nitrobenzoselenazole and 5-chloro-6-nitrobenzoselenazole;

naphthoselenazole nucleus: naphtho[2,1-d]selenazole and naphtho[1,2-d]selenazole;

3,3-dialkylindolenine nucleus: 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine and 3,3-dimethyl-5-chloroindolenine;

imidazole nucleus: 1-alkylimidazole, 1-alkyl-4-phenylimidazole, 1-alkylbenzoimidazole, 1-alkyl-5-chlorobenzoimidazole, 1-alkyl-5,6-dichlorobenzoimidazole, 1-alkyl-5-methoxybenzoimidazole, 1-alkyl-5-cyanobenzoimidazole, 1-alkyl-fluorobenzoimidazole, 1-alkyl-5-trifluoromethylbenzoimidazole, 1-alkyl-6-chloro-5-cyanobenzoimidazole, 1-alkyl-6-chloro-5-trifluoromethylbenzoimidazole, 1-alkylnaphtho[1,2-d]imidazole, 1-allyl-5,6-dichlorobenzoimidazole, 1-allyl-5-chlorobenzoimidazole, 1-arylimidazole, 1-arylbenzoimidazole, 1-aryl-5-chlorobenzoimidazole, 1-aryl-5,6-dichlorobenzoimidazole, 1-aryl-5-methoxybenzoimidazole, 1-aryl-5-cyanobenzoimidazole and 1-arylnaphtho[1,2-d]imidazole;

Herein, the above alkyl group has 1-8 carbon atoms. Preferred are a non-substituted alkyl group such as methyl, ethyl, propyl, isopropyl or butyl, and a hydroxyalkyl group such as 2-hydroxyalkyl or 3-hydroxyalkyl, and most preferred are methyl and ethyl. Examples of the above aryl groups include phenyl, halogen (e.g., chloro)-substituted phenyl, alkyl (e.g., methyl)-substituted phenyl, and alkoxy (e.g., methoxy)-substituted phenyl.

pyridine nucleus: 2-pyridine, 4-pyridine, 5-methyl-2-pyridine and 3-methyl-4-pyridine;

quinoline nucleus: 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, isoquinoline, 6-nitro-1-isoquinoline, 3,4-dihydro-1-isoquinoline and 6-nitro-3-isoquinoline;

imidazo[4,5-b]quinoxaline nucleus: 1,3-diethylimidazo[4,5-b]quinoxaline and 6 chloro-1,3-diallylimidazo[4,5-b]quinoxaline;

oxadiazole nucleus:

thiadiazole nucleus;

tetrazole nucleus; and pyrimidine nucleus.

Examples of the heterocycle having Q in the formula (I) include rhodanine nucleus, 2-thiohydanthoin nucleus, 2-thioxoazolidin-4-one nucleus, 2-pyrazolin-5-one nucleus, barbituric acid nucleus, 2-thiobarbituric acid nucleus, thiozolidine nucleus, 2,4-dion nucleus, thiazolidine-4-on nucleus, isoxazolone nucleus, hydanthoin nucleus and indandion nucleus.

$R^1$ in the formula (I) preferably has 1-7 carbon atoms, more preferably 1-4 carbon atoms. Examples of the alkyl groups expressed by $R^1$ include methyl, ethyl, propyl, isopropyl, butyl, isobutyl, hexyl, octyl, dodecyl and octadecyl. Examples of the substituted alkyl groups include aralkyl groups such as benzyl and 2-phenylethyl; hydroxyalkyl groups such as 2-hydroxyethyl group and 3-hydroxypropyl group; carboxyalkyl groups such as 2-carboxyethyl group, 3-carboxypropyl group, 4-carboxybutyl group and carboxymethyl group; alkoxyalkyl groups such as 2-methoxyethyl group and 2-(2-methoxyethoxy)ethyl group; sulfoalkyl groups such as 2-sulfoethyl group, 3-sulfopropyl group, 3-sulfobutyl group, 4-sulfobutyl group, 2-(3-sulfopropoxy)ethyl group, 2-hydroxy-3-sulfopropyl group and 3-sulfopropoxyethoxyethyl group; sulfothoalkyl groups such as 3-sulfothopropyl group and 4-sulfothobutyl group; acylaminoalkyl group such as 2-methanesulfonylaminoethyl group, 2-acetylaminoethyl group and 3-acetylaminopropyl group; heterocyclic ring substituted alkyl groups such as 2-(pyrolidin-2-on-1-yl)ethyl group and tetrahydrofrufryl group; 2-acetoxyethyl group; carbomethoxymethyl group; and 2-methanesulfonylaminoethyl group.

In the formula,

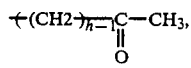

h is preferably 2.

Examples of the cyclic imide groups expressed by Y in the formula of,

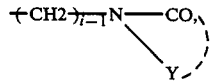

include succinimide group, phthalimide group, orthobenzosulfoimide group and maleimide group. In this fomula, i is preferably 2 or 3.

$R^1$ in the above formula (I) preferably has 1-7 carbon atoms, more preferably 1-4 carbon atoms. Examples of the alkyl groups expressed by $R^1$ include methyl, ethyl, propyl, isopropyl, butyl, isobutyl, hexyl, octyl, dodecyl and octadecyl. Examples of the substituted alkyl groups include aralkyl groups such as benzyl and 2-phenylethyl; hydroxyalkyl groups such as 2-hydroxyethyl and 3-hydroxypropyl; carboxyalkyl groups such as 2-carboxyethyl, 3-carboxypropyl, 4-carboxybutyl and carboxymethyl; alkoxyalkyl groups such as 2-methoxyethyl and 2-(2-methoxyethoxy)ethyl; sulfoalkyl groups such as 2-sulfoethyl, 3-sulfopropyl, 3-sulfobutyl, 4-sulfobutyl, 2-(3-sulfopropoxy)ethyl, 2-hydroxy-3-sulfopropyl and 3-sulfopropoxyethoxyethyl; sulfothoalkyl groups such as 3-sulfothopropyl and 4-sulfothonutyl; acylaminoalkyl groups such as 2-methanesulfonylaminoethyl, 2-acetylaminoethyl and 3-acetylaminopropyl; heterocyclic ring substituted alkyl groups such as 2-(pyrrolidin-2-on-1-yl)ethyl, tetrahydrofrufryl and 2-morpholin; 2-acetoxyethyl; carbomethoxymethyl; and 2-methanesulfonylaminoethyl. Examples of the aryl groups include phenyl and 2-naphthyl. Examples of the substituted aryl groups include 4-carboxyphenyl, 4-sulfophenyl, 3-chlorophenyl and 3-methylphenyl. Examples of the heterocyclic groups include 2-pyridyl and 2-thiazolyl.

In the formula of,

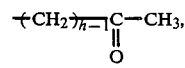

h preferably is 2.

Examples of the cyclic imide group expressed by Y in the formula of,

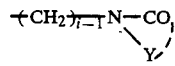

include succinimide, phthalimide, orthobenzosulfoimide and maleimide. In this fomula, i preferably is 2 or 3.

Examples of each of $L^1$ and $L^2$ in the formula (I) include methine group; alkyl groups such as methyl and ethyl; aryl groups such as phenyl; and methine group-substituted by a halogen atom (e.g., chloro or bromo). Each of $L^1$ and $L^2$ may form a ring in combination with other $L^j$.

As the merocyanine dyes having the above formula (I), there can be mentioned compounds having the following formulas.

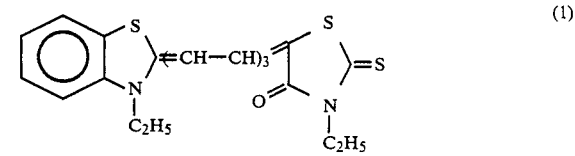

(1)

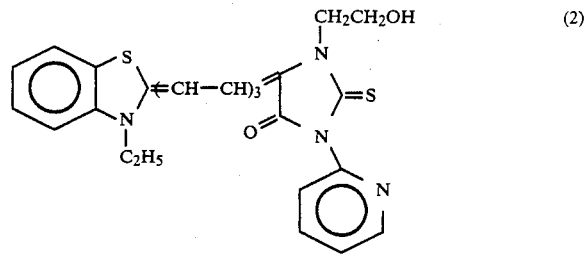

(2)

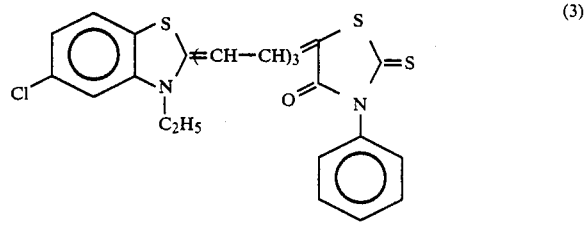

(3)

-continued
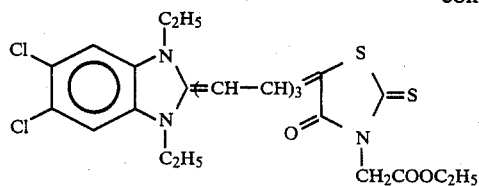 (4)
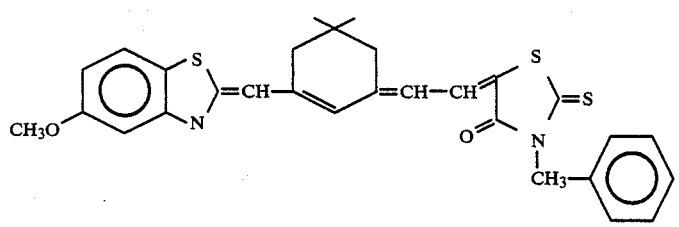 (5)
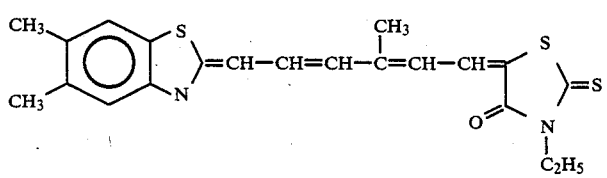 (6)
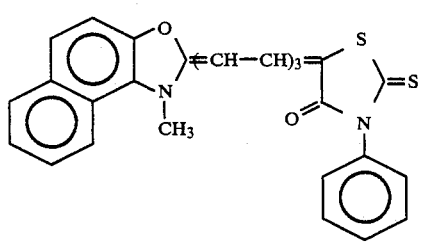 (7)
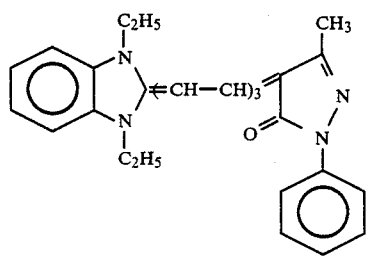 (8)
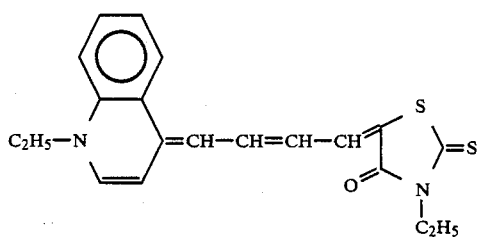 (9)
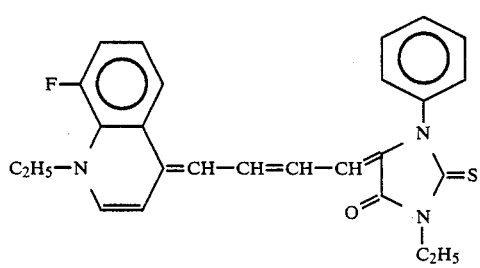 (10)

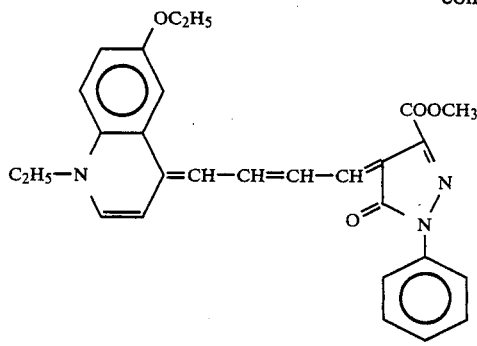
(11)
The silver salt employable in the invention is soluble in an organic solvent, and examples thereof are compounds having the following formulas.
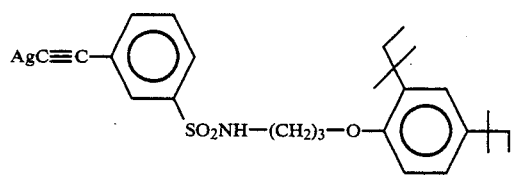
(1)
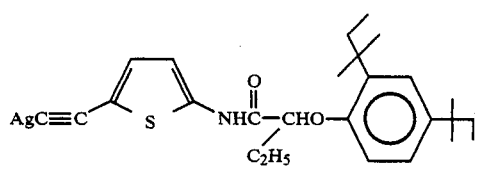
(2)
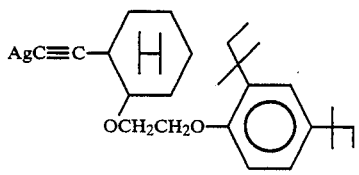
(3)
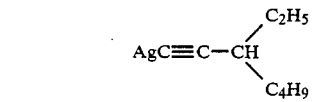
(4)
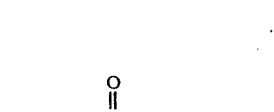
(5)
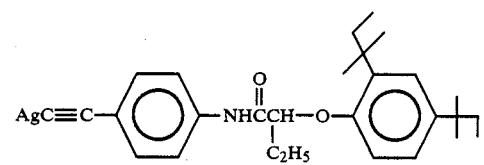
(6)
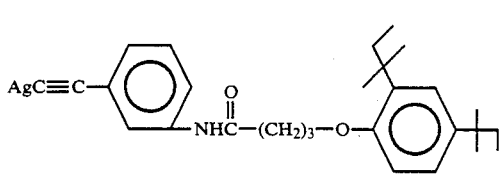
(7)
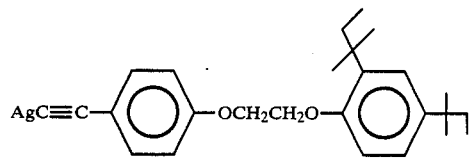
(8)
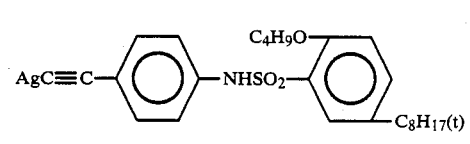
(9)
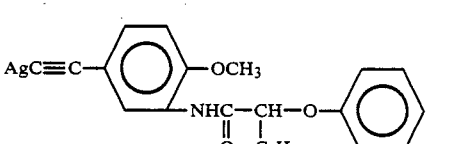
(10)
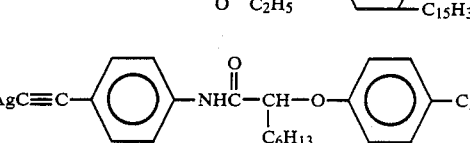
(11)
CH$_3$(CH$_2$)$_3$COOAg (12)
CH$_3$(CH$_2$)$_{10}$COOAg (13)
CH$_3$(CH$_2$)$_3$CHCOOAg
　　　　　|
　　　　C$_2$H$_5$
(14)
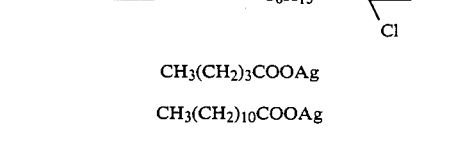
(15)
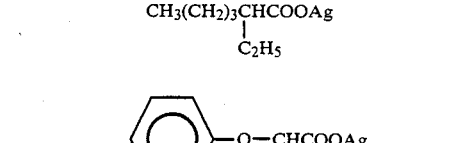
(16)
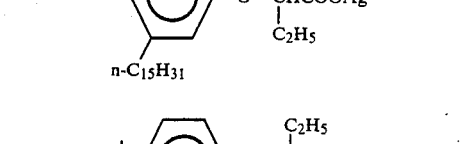
(17)

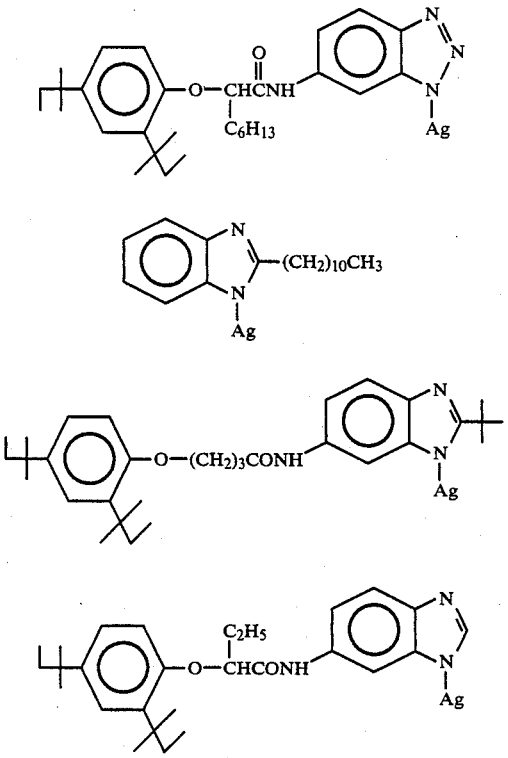

In the invention, the recording layer can be formed on the substrate by a process comprising the steps of dissolving the above-mentioned dye and organic solvent-soluble silver salt (and binder, if desired) in an appropriate solvent to prepare a coating solution, coating the solution over the surface of the substrate (or the undercoating layer), and drying the coated layer.

Examples of the binders include natural organic polymer materials such as gelatin, cellulose derivative, dextran, rosin and rubber; and synthetic organic polymer materials such as hydrocarbon resins (e.g., polyethylene, polypropylene, polystyrene and polyisobutylene), vinyl resins (e.g., polyvinyl chloride, polyvinylidene chloride and polyvinyl chloride/polyvinyl acetate copolymer), acrylic resins (e.g., methyl polyacrylate and methyl polymethacrylate), and primary precondensates of thermosetting resins (e.g., polyvinyl alcohol, chlorinated polyethylene, epoxy resin, butyral resin, rubber derivative and phenol formaldehyde resin).

Examples of the solvents for the preparation of the coating solution include solvents capable of dissolving both of the dye and the silver salt such as toluene, xylene, ethyl acetate, butyl acetate, cellosolve acetate, methyl ethyl ketone, dichloromethane, 1,2-dichloroethane, dimethylformamide, methyl isobutyl ketone, cyclohexanone, cyclohexane, tetrahydrofuran, ethyl ether, dioxane, ethanol, n-propanol, isopropanol, and n-butanol; and mixtures thereof. The coating solution for the formation of the recording layer may further contain other additives such as an antioxidant, a UV-absorbent, a plasticizer and a lubricant according to the purpose.

The coating procedure can be carried out by a conventional method such as spray coating, spin coating, dip coating, roll coating, blade coating, doctor roll coating and screen printing.

The ratio between the dye and the silver salt in the coating solution varies depending on the kinds of the dye and the silver salt, and the ratio therebetween is generally in the range of 1:100 to 100:1 (dye:silver salt, by mole), preferably in the range of 1:10 to 10:1. In the case of using a binder as a material of the recording layer, the ratio of the total amount of the dye and the silver salt to the binder is generally in the range of 0.01 to 10 wt. %, preferably 0.1 to 5 wt. %.

The recording layer may be in the form of a single layer or plural layers, and in any case, the thickness of the recording layer is generally in the range of 0.01 to 10 $\mu$m, preferably in the range of 0.02 to 1 $\mu$m.

The recording layer may be composed of substantially only the above-mentioned dye, and in this case, the recording layer can be formed on the substrate by dissolving the dye (and a binder, if desired) in an appropriate solvent to prepare a coating solution, coating the solution over the surface of the substrate, and drying the coated layer of the solution, in the same manner as described above. On thus prepared recording layer is further provided a layer of the above-mentioned organic solvent-soluble silver salt.

The layer of the organic solvent-soluble silver salt (also referred to as "silver salt layer") may be composed of substantially only the silver salt, or may be composed of a binder and the silver salt dispersed therein.

The silver salt layer can be formed on the recording layer by dissolving the silver salt (and a binder, if desired) in an appropriate solvent to prepare a coating solution, coating the solution over the surface of the recording layer by a conventional coating method such as spray coating and spin coating, and drying the coated layer of the solution.

The materials of the binder employable for the preparation of a coating solution for the silver salt layer can be selected from those used for the formation of the above-mentioned recording layer. The coating solution for the silver salt layr may further contain other additives such as an antioxident, a UV-absorbent, a plasticizer and a lubricant according to the purpose. In the case of using a binder as a material of the silver salt layer, the ratio of the silver salt to the binder is generally in the range of 0.01 to 10 wt. %, preferably 0.1 to 5 wt. %. In the case of providing the silver salt layer, the thickness of the recording layer is generally in the range of 0.01 to 10 $\mu$m, preferably in the range of 0.02 to 1 $\mu$m.

In the information recording medium of the invention, any layer of the recording layer and the silver salt layer may be arranged on the substrate side of the medium. In other words, the substrate, the recording layer and the silver salt layer may be laminated in this order as shown in FIG. 2. Otherwise, the substrate, the silver salt layer and the recording layer may be laminated in this order as shown in FIG. 3.

On the recording layer (or the silver salt layer) may be provided a reflecting layer for the purpose of increasing the S/N ratio in the reproduction procedure of information or improving a sensitivity in the recording (writing) procedure.

The reflecting layer is essentially composed of a light-reflecting material. The light-reflecting material has a high reflectance for the laser beam. Examples of the light-reflecting materials include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, CU, Ag, Au, Zn, Cd, Al, Ga, In, Si, Ge, Te, Pb, Po, Sn and Bi. Preferred are Al, Cr and Ni. These materials can be used alone or in combination. Alloys thereof can be also employed in the invention.

The reflecting layer can be formed on the recording layer using the light-reflection material according to a known method such as deposition, sputtering or ion plating. The thickness of the reflecting layer is generally in the range of 100 to 3,000 angstroms.

The reflecting layer may be provided between the substrate and the recording layer, and in this case, the recording and reproduction of information is carried out from the recording layer side, namely the opposite side of the substrate side.

A protective layer may be further provided on the recording layer (or on the silver salt layer or on the reflecting layer) to physically or chemically protect the recording layer. The protective layer can be also provided on the surface of the substrate where the recording layer is not provided to enhance a resistance to damage or humidity. As a material of the protective layer, there can be mentioned inorganic materials such as SiO, $SiO_2$, $MgF_2$ and $SnO_2$; and organic materials such as thermoplastic resins, thermosetting resins and UV-curable resins.

The protective layer can be formed on the recording layer (or the silver salt layer, or the reflecting layer) and/or the substrate by laminating a plastic film having been prepared by extrusion processing over any of those layers and/or the substrate by way of an adhesive layer. Otherwise, a method of vacuum deposition, sputtering or coating can be also applied to form the protective layer. In the case of using the thermoplastic resin or the thermosetting resin, the resin is dissolved in an appropriate solvent to prepare a coating solution, and the solution is coated over the recording layer and/or the substrate. The coated layer is then dried to form a protective layer. In the case of using the UV-curable resin, a solution of the resin in an appropriate solvent is coated over the recording layer and/or the substrate, and the coated layer of the solution is irradiated with ultraviolet rays to cure the layer so as to form a protective layer. In any case, the coating solution may further contain a variety of additives such as an antistatic agent, an antioxidant and a UV-absorbent according to the purpose. The thickness of the protective layer is generally in the range of 0.1 to 100 μm.

The structure of the information recording medium according to the present invention is by no means limited to the above-mentioned one, and other structures can be also applied to the invenetion. For example, there can be included in the invention an information recording medium in which two substrates having the above-mentioned constitution and interposing the recording layer are combined using an adhesive, or an information recording medium of air-sandwich structure in which two disc-shaped substrates, at least one of those substrates having the above-mentioned constitution, are combined with each other by way of a ring-shaped outer spacer and a ring-shaped inner spacer so as to form a closed space surrounded by the two substrates and the two spacers.

Examples for the present invention are given below, but these examples by no means restrict the invention.

EXAMPLE 1

A merocyanine dye having the following formula and a silver salt having the following formula were dissolved in chloroform to prepare a coating solution having a ratio between the dye and the silver salt of 1:1, by mole, and having a concentration of 1 wt. %.

Merocyanine dye:

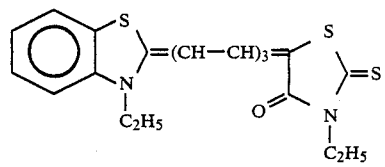

Silver salt:

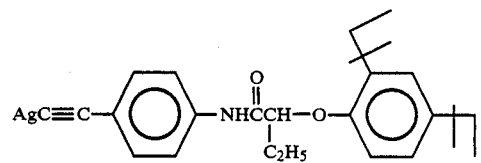

The obtained solution was coated over a disc-shaped substrate of cell-cast polymethyl methacrylate resin having been provided with a tracking guide (outer diameter: 130 mm, inner diameter: 15 mm, thickness: 1.2 mm, track pitch: 1.6 μm) by means of spin coating to give a coated layer of the solution, and the coated layer was dried to form a recording layer having dry thickness of 0.06 μm on the substrate.

Thus, an information recording medium consisting essentially of a substrate and a recording layer was prepared (see: FIG. 1).

COMPARISON EXAMPLE 1

The procedure of Example 1 was repeated except for not using the silver salt in the preparation of a coating solution, to prepare an information recording medium consisting essentially of a substrate and a recording layer.

The information recording media obtained in Example 1 andd Comparison Example 1 were evaluated on the reflection properties and the reading (reproduction) preperties according to the following tests.

(1) Reflection property

The evaluation of the reflection property of the recording medium was done by measuring a reflectance of the recording layer at a wavelength of a semiconductor laser beam (830 nm).

(2) Reading (reproduction) properties

The evaluation of reading property of the recording medium was done by irradiating the medium having been provided with pits and recorded with information with a semiconductor laser beam (wavelength: 830 nm) to read out the recorded information, and measuring a ratio of carrior to noise in the output level (C/N ratio).

The results of the evaluations are given in Table 1.

TABLE 1

|  | Relative Reflectance (%) | C/N Ratio (dB) |
| --- | --- | --- |
| Example 1 | 30 | 50 |
| Com. Example 1 | 10 | 20 |

As is evident from the results set forth in Table 1, the information recording medium containing both of the merocyanine dye and the silver salt according to the invention (Example 1) showed a higher reflectance at the wavelength given by the semiconductor laser and a prominently increased C/N ratio, as compared with the conventional information recording medium containing only the merocyanine dye (Comparison Example 1).

Further, the recording medium of the invention is much more improved in the durability (endurance) than the conventional one.

We claim:

1. A method for recording information comprising irradiating a recording medium which comprises a substrate and a recording layer containing an organic solvent-soluble silver salt and a dye having at least one chromophore selected from the group consisting of an amidinium ion chromophore, a carboxyl ion chromophore and a dipolar amide chromophore, with a laser beam to form pits corresponding to the information in the recording layer.

2. The information recording method as claimed in claim 1, wherein said dye is a merocyanine dye.

3. The information recording method as claimed in claim 2, wherein said dye is a merocyanine dye having the formula (I):

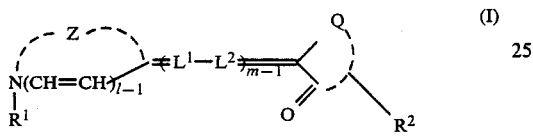

in which Z is a nonmetal atom group or a combination of nonmetal atoms required for forming a 5-6 membered heterocyclic ring; Q is a combination of nonmetal atoms group required for forming a 5-6 membered heterocyclic ring containing a nitrogen atom; each of $L^1$ and $L^2$ is a methine group or a substituted methine group; l is 1 or 2, m is 3 or 4, and l and m are integers satisfying the condition of $l+m=5$; $R^1$ is an alkyl group having 1-18 carbon atoms, an allyl group or a group having the following formula:

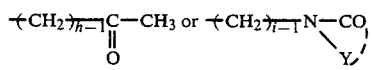

in which Y is a cyclic imide group, and each of h and i is an integer of 2 to 5; and $R^2$ is bonded to the nitrogen atom of said heterocyclic ring and is an alkyl group having 1-18 carbon atoms, a substituted alkyl group, an allyl group, an aryl group, a substituted aryl group, a heterocyclic group or a group having the following formula:

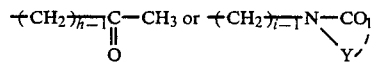

in which Y, h and i have the same meanings as defined above.

4. A method for recording information comprising irradiating a recording medium which comprises a substrate, a recording layer containing a dye having at least one chromophore selected from the group consisting of an amidinium ion chromophore, a carboxyl ion chromophore and a dipolar amide chromophore, and an organic solvent-soluble silver salt-containing layer arranged in contact with the recording layer, with a laser beam to form pits corresponding to the information in the recording layer.

5. The information recording method as claimed in claim 4, wherein said dye is a merocyanine dye.

6. The information recording method as claimed in claim 4, wherein said dye is a merocyanine dye having the formula (I):

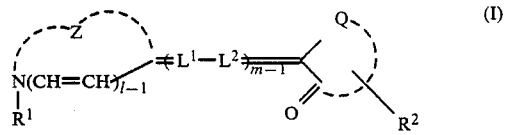

in which Z is a nonmetal atom group or a combination of nonmetal atoms required for forming a 5-6 membered heterocyclic ring; Q is a combination of nonmetal atoms group required for forming a 5-6 membered heterocyclic ring containing a nitrogen atom; each of $L^1$ and $L^2$ is a methine group or a substituted methine group; l is 1 or 2, m is 3 or 4, and l and m are integers satisfying the condition of $l+m=5$; $R^1$ is an alkyl group having 1-18 carbon atoms, a substituted alkyl group, an allyl group or a group having the following formula:

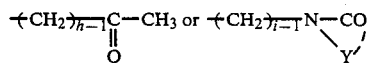

in which Y is a cyclic imide group, and each of h and i is an integer of 2 to 5; and $R^2$ is bonded to the nitrogen atom of said heterocyclic ring and is an alkyl group having 1-18 carbon atoms, a substituted alkyl group, an allyl group, an aryl group, a substituted aryl group, a heterocyclic group or a group having the following formula:

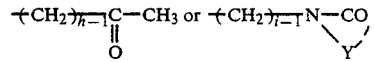

in which Y, h and i have the same meanings as defined above.

7. A method for reading information recorded in the form of pits in a recording layer provided on a substrate wherein the recording layer contains an organic solvent-soluble silver salt and a dye having at least one chromophore selected from the group consisting of an amidinium ion chromophore, a carboxyl ion chromophore and a dipolar amide chromophore, by irradiating the recording layer with a laser beam to detect the pits.

8. The information reading method as claimed in claim 7, wherein said dye is a merocyanine dye.

9. The information reading method as claimed in claim 7, wherein said dye is a merocyanine dye having the formula (I):

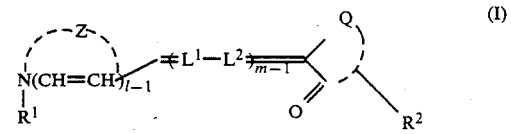

in which Z is a nonmetal atom group or a combination of nonmetal atoms required for forming a 5-6 membered heterocyclic ring; Q is a combination of nonmetal atoms group required for forming a 5-6 membered heterocyclic ring containing a nitrogen atom; each of $L^1$ and $L^2$ is a methine group or a substituted methine group; l is 1 or 2, m is 3 or 4, and l and m are integers satisfying the condition of $l+m=5$; $R^1$ is an alkyl group having 1-18 carbon atoms, an allyl group or a group having the following formula:

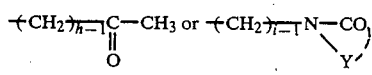

in which Y is a cyclic imide group, and each of h and i is an integer of 2 to 5; and $R^2$ is bonded to the nitrogen atom of said heterocyclic ring and is an alkyl group having 1-18 carbon atoms, a substituted alkyl group, an allyl group, an aryl group, a substituted aryl group, a heterocyclic group or a group having the following formula:

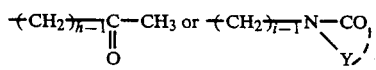

in which Y, h and i have the same meanings as defined above.

10. A method for reading information recorded in the form of pits in a recording layer provided on a substrate wherein said recording layer is arranged in contact with a layer containing an organic solvent-soluble silver salt and contains a dye having at least one chromophore selected from the group consisting of an amidinium ion chromophore, a carboxyl ion chromophore and a dipolar amide chromophore, by irradiating the recording layer with a laser beam to detect the pits.

11. The information reading method as claimed in claim 10, wherein said dye is a merocyanine dye.

12. The information reading method as claimed in claim 10, wherein said dye is a merocyanine dye having the formula (I):

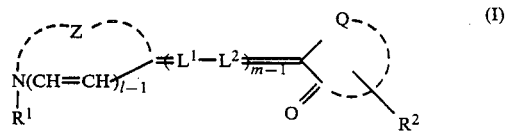

in which Z is a nonmetal atom group or a combination of nonmetal atoms required for forming a 5–6 membered heterocyclic ring; Q is a combination of nonmetal atoms group required for forming a 5–6 membered heterocyclic ring containing a nitrogen atom; each of $L^1$ and $L^2$ is a methine group or a substituted methine group; l is 1 or 2, m is 3 or 4, and l and m are integers satisfying the condition of $l+m=5$; $R^1$ is an alkyl group having 1-18 carbons atoms, a substituted alkyl group, an allyl group or a group having the following formula:

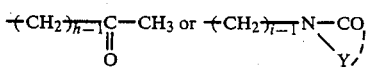

in which Y is a cyclic imide group, and each of h and i is an integer of 2 to 5; and $R^2$ is bonded to the nitrogen atom of said heterocyclic ring and is an alkyl group having 1-18 carbon atoms, a substituted alkyl group, an allyl group, an aryl group, a substituted aryl group, a heterocyclic group or a group having the following formula:

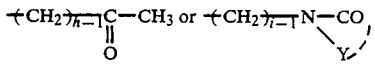

in which Y, h and i have the same meanings as defined above.

* * * * *